United States Patent [19]
Zettl et al.

[11] Patent Number: 6,057,637
[45] Date of Patent: May 2, 2000

[54] FIELD EMISSION ELECTRON SOURCE

[75] Inventors: Alexander Karlwalter Zettl, Kensington; Marvin Lou Cohen, Berkeley, both of Calif.

[73] Assignee: The Regents of the University of California, Oakland, Calif.

[21] Appl. No.: 08/884,450

[22] Filed: Jun. 27, 1997

Related U.S. Application Data

[60] Provisional application No. 60/026,032, Sep. 13, 1996.

[51] Int. Cl.[7] .................................................. H01J 1/30
[52] U.S. Cl. ..................... 313/310; 309/336; 309/351; 309/497; 428/367; 428/366; 428/398
[58] Field of Search ................................. 313/309, 336, 313/351, 310, 495, 496, 497; 495/60; 428/367, 408, 336, 323, 327, 366, 398, 402

[56] References Cited

U.S. PATENT DOCUMENTS

| | | | |
|---|---|---|---|
| 5,697,827 | 12/1997 | Rabinowitz | 445/60 |
| 5,726,524 | 3/1998 | Debe | 313/351 |
| 5,764,004 | 6/1998 | Rabinowitz | 445/60 |

OTHER PUBLICATIONS

A.G. Rinzler, et al., *Science* 269, 1550–1553, Dec. 1995.
W.A. de Heer, et al., *Science* 270, 1179–1180, Dec. 1995.
N.G. Chopra, *Science,* 269:966, Dec. 1995.
T. Studt, "Innovation Spurs/Hardware Technologies," *R & D Magazine*, Apr. 1996, pp. 14–17.

*Primary Examiner*—Ashok Patel
*Attorney, Agent, or Firm*—Coudert Brothers

[57] ABSTRACT

A novel field emitter material, field emission electron source, and commercially feasible fabrication method is described. The inventive field emission electron source produces reliable electron currents of up to 400 mA/cm$^2$ at 200 volts. The emitter is robust and the current it produces is not sensitive to variability of vacuum or the distance between the emitter tip and the cathode. The novel emitter has a sharp turn-on near 100 volts.

25 Claims, 5 Drawing Sheets

FIELD EMISSION ELECTRON SOURCE

This application claims priority benefits of provisional application Ser. No. 60/025,032 filed Sep. 13, 1996.

This invention was made with U.S. Government support under Contract No. DE-AC03-76SF00098 between the U.S. Department of Energy and the University of California for the operation of Ernest Orlando Lawrence Berkeley National Laboratory. The U.S. Government may have certain rights in this invention.

I. BACKGROUND OF THE INVENTION

1. Field of the Invention

This invention relates generally to field emission electron sources and more specifically to field emitter materials.

2. Description of Related Art

Nanotubes made from carbon or from the combination of carbon, boron, and nitrogen have interesting structural and electronic properties that could be useful for many applications. Utilities that have been considered include high-strength lightweight fibers, chemical filters, catalysis aids, and miniature electronic wires and devices (S. Iijima, *Nature* 354, 56–58, 1991). The electrical properties of carbon-containing nanotubes are predicted to vary widely as a function of tube chirality, composition, and diameter (J. W. Mintmire, B. I. Dunlap, & C. T. White, *Phys. Rev. Lett.* 68, 631, 1992; N. Hamada, S. Sawada & A. Oshiyama, *Phys. Rev. Lett.* 68, 1579, 1992). Because some multi-wall nanotubes may have a complicated combination of concentric individual tubes, each with different properties, and because of the difficulty of manipulating and measuring the properties of nanoscale objects, development of carbon nanotubes for useful applications has been hampered.

A. G. Rinzler et al. (Science 269, 1550–1553, 1995) has in the past demonstrated laser-irradiation-induced electron field emission from an individual carbon nanotube. Unfortunately, for many uses of electron field emission devices it is physically cumbersome, costly, and unfeasible to use laser assisted field emission devices, such as Rinzler demonstrated. Further, the variability of emission from tube to tube makes this approach commercially unfeasible.

W. A. de Heer et al. (Chatelain, A. & Ugarte, D. Science 270, 1179–1180, 1995) have used arrays of carefully aligned carbon nanotubes to produce field emission sources. However, the difficulty of producing carefully aligned nanotubes and the fragility of the resulting structure prevents these arrays from being commercially useful.

Field emission displays (FED) are a promising challenger to the liquid crystal displays (LCD) currently used for most flat panel electronic displays. Compared to LCDs, FEDs are three times brighter, half as thick, have almost twice the viewing angle, one forth the power consumption, and more than twice the thermal operating range. But several technical barriers block use of FEDs in current flat panel displays. The barriers include: 1) maintaining the correct spacing between the field emitter tip and the cathode plate so as to maintain constant emission current on the cathode, 2) maintaining an appropriate Internal vacuum, and 3) robustness (T. Studt, Innovation spurs hardware advances, R&D Magazine, p. 14–17, April 1996).

II. SUMMARY OF THE INVENTION

It is an object of invention to provide a reliable, nonfragile, and robust field emission source. It is a further object of the invention to provide a field emission electron source having stable and reproducible current-voltage characteristics, that do not require ultra high vacuum and do not vary widely with spacing between the field emitter tip and cathode. It is yet another object of the invention to provide a field emission electron source having a sharp turn-on, near 100 volts and having emission current densities of up to 400 milliamps (mA) per square centimeter (cm) at about 200 volts. A further important object of the invention is to provide a method of making the sources that is straightforward and commercially feasible.

The present invention comprises a stable, high-density electron beam field emission source from a carbon nanotube matrix and a method of making the novel source. The inventive carbon nanotube electron source does not require laser irradiation induction. The source is functionally self-regenerating and thus virtually impervious to mechanical or electrical damage. Unlike previous configurations, alignment and manipulation of the nanotubes are unnecessary. The inventive methodology is straightforward making commercial fabrication feasible.

The field emission electron source uses a novel field emitter material comprising a volume of binder and a volume of nanotubes suspended in the binder, where the nanotubes are made essentially from carbon or essentially from the combination of carbon, boron, and nitrogen ($B_XC_YN_Z$ nanotubes).

IV. DETAILED DESCRIPTION OF THE INVENTION

The present invention comprises a field emitter material that can be used in novel field emission electron sources. The field emitter material comprises a volume of "binder", for example epoxy, and a volume of nanotubes suspended in the binder to form a binder-nanotube matrix. The nanotubes are made essentially from carbon or essentially from the combination of carbon, boron, and nitrogen ($B_XC_YN_Z$, nanotubes). Alternately, the field emitter material comprises nanotubes bound directly to one another, without use of a second binder material, to form a nanotube matrix. The invention further comprises novel field emission electron sources using the inventive matrix as an emission material. Pixels made from the inventive field emission electron sources are of a micrometer scale or smaller, even resolving to the nanometer scale. The inventive field emitter material additionally provides nanoscale extremely high voltage sources.

Use of the term "binder" herein means a binding compound of suitable mechanical properties to retain suitably configured carbon nanotubes in the compound material's structure.

Use of the term "$B_XC_YN_Z$" herein means amounts of boron, carbon, and nitrogen used in the ratios indicated by the subscripts "X", "Y", and "Z". For example, an essentially $B_XC_YN_Z$ nanotube in which X and Z are both zero and Y is one, is equivalent to an essentially carbon nanotube.

Use of the term "matrix" herein means a volume of nanotubes bound together. For example, either a combination of binder and nanotubes or nanotubes bound directly to one another would constitute a matrix.

Use of the term "field emitter material" herein means a material that emits electrons when sufficient voltage is applied to the material.

Use the term "individual electron emitter" herein means one or more nanotubes configured so that a single point, on the one or more nanotubes, emits electrons when sufficient voltage is applied.

The inventive field emission electron source comprises nanotubes made essentially from carbon or nanotubes made essentially from the combination of carbon, boron, and nitrogen. Nanotubes made from the combination of carbon, boron, and nitrogen are synthesized according to the methods described in copending application Ser. No. 08/388,494, entitled, "Miniature Particles and Tubes Based on Compounds of $B_XC_YN_Z$ and Production Thereof", and incorporated herein by reference.

Nanotubes made essentially from carbon were synthesized in a conventional plasma arc-discharge (T. W. Ebbesen and P. M. Ajayan, Nature 358, 220, 1992) as described elsewhere (N. G. Chopra et al., Nature 377, 135–138, 1995), incorporated by reference herein. Basically, the carbon nanotubes were prepared by a carbon-arc discharge method. The synthesis chamber employed a water-cooled 0.625-inch graphite anode, a water-cooled copper cathode, 650 Torr of environmental helium pressure, a 120 A direct electrode current (d.c.), and an electrode gap of a few millimeters. The carbon growth on the negative electrode was removed from the synthesis chamber, dispersed in ethanol, and baked in oxygen at about 650° C. to remove amorphous and graphitic carbon particles as described by T. W. Ebbesen, et al., Nature 367, 519, 1994. The carbon material resulting from this process was characterized by transmission electron microscopy (TEM) using a JEM JEOL 200CX TEM with 200 keV accelerating voltage. The material was observed to be tube-rich, composed of at least 70% multi-walled tubes with diameters between 5 and 50 nm. Tube lengths range from stub-like growths of a few hundred nm to fibers 10 $\mu$m and longer which could not be fully imaged within the TEM range. High resolution TEM inspection of the tubes revealed that many of the tube ends are tapered, with ultimate tip radii of curvature smaller than the distribution of tube diameters would suggest. The sharpest tips, which are most likely to act as emitters, were observed to have radii of curvature between 1 and 3 nm. In a random collection of tubes of different diameters, it is possible that a large fraction of the tubes serve as efficient electron emitters, with emission properties only weakly sensitive to the distribution of gross tube geometric or electronic properties. Nanotubes used in the inventive field emission source are electrically conducting when large voltages are applied even though the tubes would be conventionally characterized as semimetallic, semiconducting, or insulating when a small voltage on the order of one or a few volts is applied. When the terms "conducting", "semimetallic", "semiconducting", or "insulating" are used to describe a material in this document, they are used as those properties under conventional measuring conditions, using an applied voltages of about a volt to the material being characterized.

Using nanotubes with different conducting properties alters the turn-on voltage of the inventive field emission electron source. The novel field emission electron source comprises $B_XC_YN_Z$ nanotubes having uniform electrical properties, characterized as electrically conducting, semimetallic, semiconducting, or insulating. Alternatively the source comprises a mixture of nanotubes, in which some of the nanotubes are characterized as having one of the above listed electrical characteristics, and other nanotubes in the source have one or more of the other electrical characteristics. Furthermore, the electrical properties can be mixed along the length of a nanotube, wherein one region of a nanotube has one of the above listed electrical characteristics, and other regions of the same nanotube have one or more of the other electrical characteristics.

There is evidence that individual nanotubes with specific electrical properties have particularly good field emitting characteristics. For example, short, electrically insulating nanotubes may behave like thin films of diamond, which have been demonstrated to have good field emitter properties. Additionally, semiconducting nanotubes tipped with metallic material (N. G. Chopra, Science 269:966, 1995) promise to have good emitter properties. The inventive field emission source may have enhanced emission properties if made from nanotubes enriched with insulators or metal-tipped semiconductors. The enriched regions comprise nanotubes between about 2 angstroms (Å) and about 30 microns in length. Alternatively, the nanotubes are between about 2 Å and about 10 Å in length. In another embodiment the nanotubes are between about 10 Å and about 100 Å long. In yet another embodiment, the nanotubes are between about 100 Å and about 30 microns long.

Nanotube tip shapes vary as a function of the nanotube structure. Typically, the carbon, boron, and nitrogen form an array of six-membered rings. If the tubes are thought of as having been rolled from a plane containing the array of six-membered rings, it becomes apparent that the tube may be rolled in a straight or skewed fashion. Another way to see this is that a trace of adjacent rings may form a circle or a helix around the outside of the nanotube. The degree of helicity affects the geometry of the tip. This is thoroughly described in copending application Ser. No. 08/792,461, titled "Metal/Semiconductor Junction Nanotube Devices", and Incorporated herein by reference. One way in which the helicity is affected is by the occasional occurrence of a five-membered or seven-membered ring in the six-membered array. Presence of a five-membered ring results in a concave tip shape; a seven-membered ring results in a convex tip shape. The terms concave and convex are descriptive but approximate. A more rigorous definition is that five-membered rings give positive Gaussian curvature and seven-membered rings produce negative Gaussian curvature (that is, curvature that reduces the radius of a cylindrical tube and curvature that increases the radius of a cylindrical tube, respectively). Four-membered rings can also be inserted in the six-membered array to modify the nanotube helicity and local electrical properties. For most purposes a sharp tip acts as a better emitter than a dull tip. However there may be special applications in which a special tip shape, for example a duckbill shape, is preferable.

Figure 1A:
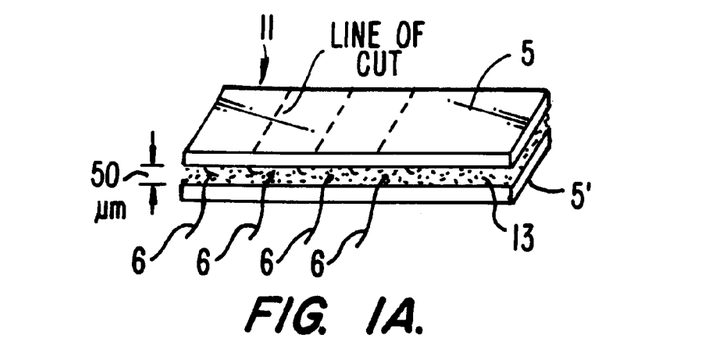
FIG. 1A: shows the preparation from which experimental versions of the inventive field emission electron source are constructed.
Figure 1B:
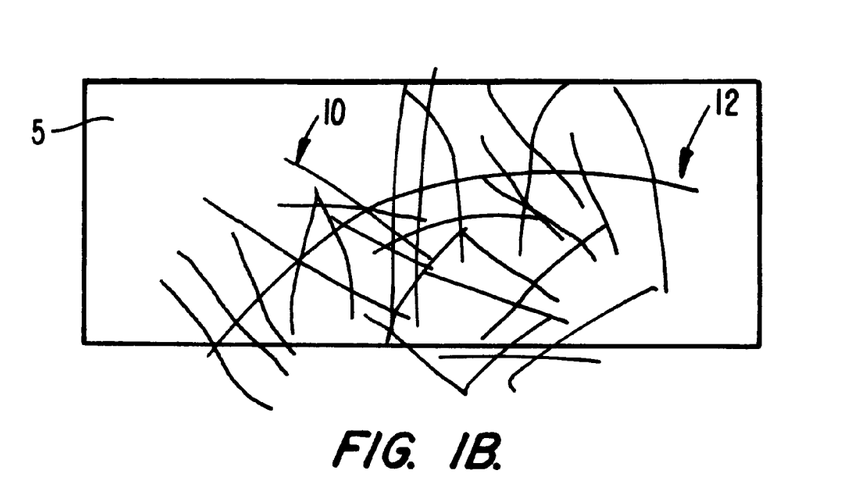
FIG. 1B: shows a traced drawing SEM micrograph of nanotube matrix emission surface. Tube bundles can be seen bristling from the matrix surface with an approximate density of $1/\mu m^2$. The sketch in FIG. 1A depicts the matrix sample laminated between glass plates.

The material resulting from the procedure above yields a mixture of carbon nanotubes and particles, referred to as "tube-rich" material. The nanotubes can be purified out of the tube-rich material but it was found unnecessary for the present application. Tube-rich material was mixed into a binder by placing a drop of epoxy liquid on a glass slide next to an amount of tube-rich material and stirring them together with a toothpick or similar implement. FIG. 1B in most cases approximately 100 microliters of each compound was used resulting in solidified conductive mixtures. When non-conductive epoxy was used as a binder, typical resistivities of about 500 $\Omega$-cm were obtained. The concentration of nanotubes in the binder can be adjusted higher or lower depending upon the demands of the application. In a non-conducting binder, lowering the concentration of electrically conducting nanotubes increases the resistivity. In a non-conducting binder, the concentration of electrically conducting nanotubes in the binder must be high enough that there is electrical conductivity between an electrode attached to the matrix and the individual nanotube emitters. That is, the concentration of conducting nanotubes is high enough to conduct charge in the matrix.

The matrix becomes an electron emitter material when its resistivity is between that of metallic resistivity, that is about one $\mu\Omega$-cm, and about 500K $\Omega$-cm, that is essentially non-conducting. More preferably, the resistivity of an electron emitter material was formed from matrix having a resistivity between about 1 $\mu\Omega$-cm and about 50 k$\Omega$-cm. Most preferably the resistivity of an electron emitter material was formed from matrix having a resistivity between about 1 $\mu\Omega$-cm and about 5 k$\Omega$-cm.

The binder is comprised of any of a number of compounds or materials, many commercially available, having suitable mechanical properties to retain carbon nanotubes in the material's structure. Some examples are one and two-part epoxies, conducting epoxies—for example silver epoxy, non-conducting epoxies such as Torr Seal® or Stycast®, teflon, cyanoacrylate, Crazy Glue®, polyethylene, ceramic, soft metals, low melting point metals, or other material that can hold the nanotubes. For some materials such as teflon and soft metals, the nanotubes may be simply pressed into the material or compound material.

The field emitter material can comprise nanotube rich material bound into a matrix without using a binder. Nanotube-rich material is compacted in a simple pellet press (piston/cylinder device) to a pressure sufficient to have the nanotubes "stick" to each other and form a cohesive matrix. The field emitter material is then attached to a suitable substrate using a conductive adhesive, for example, silver epoxy or silver paint. The field emission electron source made with this type of matrix has a high density of nanotube emission sources.

An alternate method of joining the nanotubes together without use of a binder material comprises using electromagnetic radiation, for example an rf furnace or UV light, to construct a matrix of nanotubes. Using nanotubes containing five-membered rings and seven-membered rings enhances a tendency for nanotube crosslinking. A field emission electron source having this matrix as its field emitter material exhibits a high density of field emission nanotube-tip sources on the surface of its field emitter material.

No attempt was made to align the nanotubes within the binder-nanotube matrix. The bundles of tubes within the matrix are assumed to be completely disordered, however some fraction of the tubes pierce the binder surface and extend their tips outward well beyond the surface. It is these extended tube tips that constitute the emission source of the emitter surface. The number of protruding tips is sufficient to generate large and reproducible emission currents.

Figure 1C:
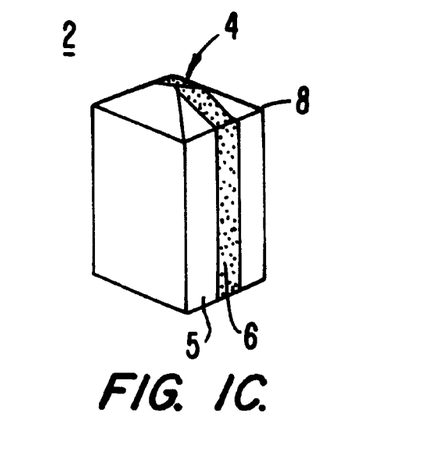
FIG. 1C: shows an experimental configuration of the inventive field emission electron source. The emission facet on top has an area of 50 $\mu$m×50 $\mu$m.

FIG. 1C shows one configuration of an inventive field emission electron source 2. Sample sources were constructed, each having an emission surface area 4 of about 50 $\mu$m×50 $\mu$m. This sample corresponds to a single pixel. About 100 $\mu$l each of epoxy and tube-rich material was mixed on a clean microscope slide 7. A gold wire 6 of about 2 mm diameter was placed on the epoxy-nanotube mixture 13, crosswise to the length of the slide 5. Then a second microscope slide 5' was placed over the epoxy-nanotube mixture 13. The slides were spaced 50 $\mu$m apart using shims. The matrix was allowed to dry between the microscope slides under pressure applied by a #50 binder clip. A crosswise strip 11 containing the electrode was cut from slide-matrix assembly. FIG. 1A the short end 8 of the strip was then ground back to expose a square sample facet 4 which served as the electron emission surface. In some cases the emission surface was lightly polished with 400 grit sandpaper to yield a reproducible and approximately flat surface. Scanning electron microscopy (SEM) characterization of the polished surface imaged bundles of nanotubes on the surface, showing a typical density of 1 bundle per $\mu$m$^2$. It was found that sanding was not a necessary step in constructing an operating sample because the distance between the emitter and the cathode did not affect the emission current. This feature is discussed more, below. FIG. 1B shows a diagram of a typical SEM image of the emission surface. The nanotubes 10 appeared to stick out in all directions like the spines on a cactus. The bases of the nanotubes remain firmly embedded in the matrix 12 which contains a gold lead that serves as an electrical contact to the conductive matrix. The electrode can be made of any conducting wire or substance and there are many other ways to attach the electrode to the matrix as is well known by those who practice in this art.

In practice, the pixel sizes constructed can vary greatly, depending on the intended application. The 50 $\mu$m×50 $\mu$m size chosen above is typical for a television screen or flat panel display. A pixel size as small as 1 $\mu$m$^2$ is achieved by adjusting the concentration of nano-tubes downward. If the concentration becomes too low to for the matrix to be conductive, a conducting binder is used.

The emission surface is exceedingly robust. Even harsh mechanical sanding or, as described below, "burning" of the epoxy-nanotube matrix surface by high voltage arcing results in exposure of new tube tips from the underlying matrix. The newly exposed tips serve as fresh emission sources when old ones break off, bend over, or are otherwise damaged. The surface is self-regenerating in the sense that new functionally competent surface constantly replaces damaged surface as needed.

Figure 2:
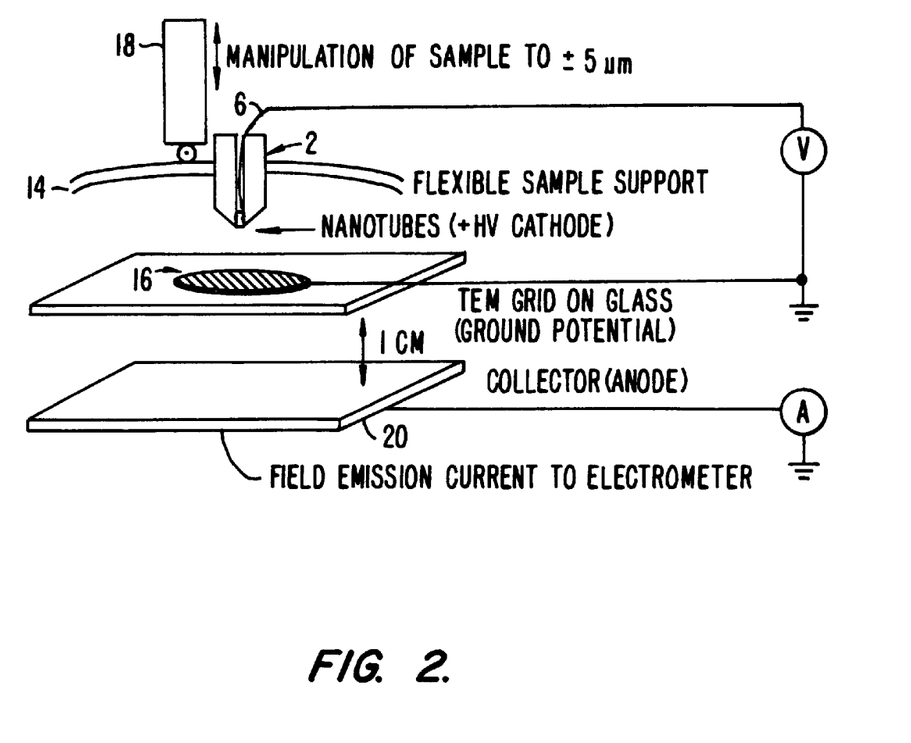
FIG. 2: shows a field emission experimental set-up. The apparatus is housed in a vacuum chamber at about $10^{-6}$ torr.

FIG. 2 depicts the experimental apparatus used to determine field emission characteristics from the field emission electron source constructed as described above. A sample source 2 was attached to a flexible holder 14, such as a glass microscope slide that would bow slightly under pressure from a micrometer. The sample was aligned directly above a conducting grid 16. One type of grid found useful was a commercially available 3 mm diameter TEM grids. A micrometer 18 was used to move the sample holder up and down with respect to the grid and collector so that the dependence of emission current on that separation could be measured. Negative dc voltages up to 1000 volts were applied to the sample, and the emission currents which passed through the 50% transmitting grid 16 were collected on a collector 20 and measured by an electrometer. Although the experiments were conducted at $10^{-6}$ torr, the emission was not excessively sensitive to the vacuum quality; similar emission was observed at $10^{-3}$ torr as well. These results are extremely important. They demonstrate that the inventive field emission sources do not have to be operated under ultra high vacuum.

EXAMPLE 1

Figure 3:
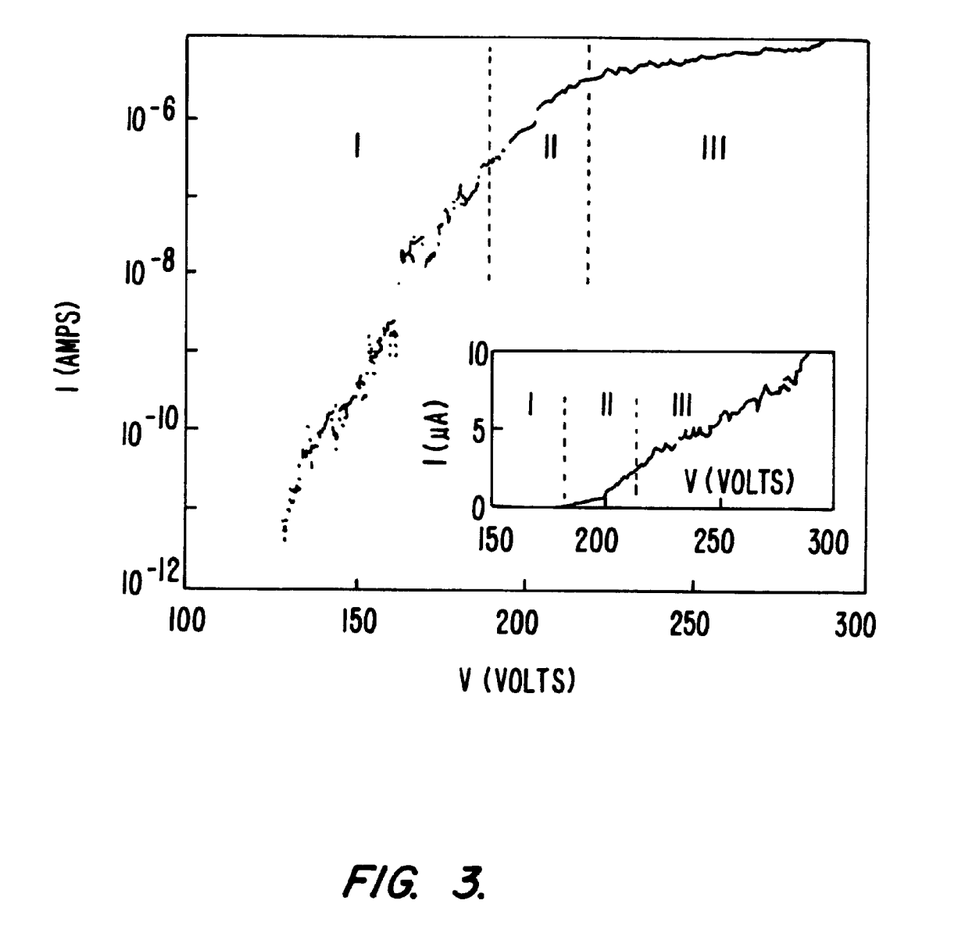
FIG. 3: shows an I-V curve for field emission from carbon nanotube matrix sample on a log-linear scale. The inset shows the same data on a linear-linear scale. Three distinct emission regions (I, II, and III) are observed.

FIG. 3 shows a typical emission current (I) versus sample-to-grid bias voltage (V) characteristic on a log-I, linear-V scale that was obtained using the apparatus illustrated in FIG. 2. The current displayed a sharp onset near 130 volts and increased exponentially with increasing V. Distinct regions were easily identified. Below the onset voltage, the device was "off" with currents below our experimental limit of 1 pA. Above the onset, the emission turned on but increased at different rates in the three voltage regions, as labeled in the figure. In Region I, the current rose exponentially at a rate of 1 order of magnitude every 10 volts, up to a current of 10 nA. In this region, the emission current exhibited ±50% fluctuations, as well as short-lived current decreases by an order of magnitude. The exponential rise crested in Region II, and the negative curvature in the log-I representation indicated tendency towards some type of current saturation. In Region III, at still higher voltages, the current again rose exponentially but at only one-tenth the rate of Region I. The inset to FIG. 3 shows the same data plotted on a linear-I linear-V scale.

Although the emission onset voltage showed some sample-to-sample variation, all samples show the same three-region characteristic I-V structure depicted in FIG. 3. Furthermore, all samples (prepared in the manner described above) emitted currents of at least 1 nA at only 200 volts. Samples typically yielded current densities up to and exceeding 400 mA/cm² at 200 V. Handling of the samples notably did not affect the field emission density or stability. Samples were routinely brought into direct contact with the grid to calibrate the separation distance, which caused no change in field emission quality or character. To further test sample robustness, samples were arced at high voltage against the grid, momentarily passing up to 100 mA of current. Despite the likelihood of significant surface damage, arced samples still achieved appreciable emission currents. Generally emission from arced samples maintained similar voltage onsets but in some cases the current magnitude varied within a multiplicative factor of 5. The persistence of emission is thought to be due to two factors: (1) the density of tube tips is uniform throughout the matrix, so that removal of surface material creates as many emitters as it destroys; and (2) the emission characteristics only weakly depend on the grid separation, so tube tips on an unpolished surface emit as well as they do from a smooth surface.

Under constant voltage bias in Region III, the samples displayed stable emission currents over many hours. At a bias of 200 volts, total emission currents ranged from 0.01–10 µA depending on the initial density of tubes used in the matrix preparation. For our sample size, this corresponds to current densities as high as 400 mA/cm². Assuming that every tube observable in an SEM image emits, each tube must on average carry 10 nA. It is possible that only a small fraction of the tubes actually emit and those that do carry much higher currents.

When comparing different samples, or the same sample after different degrees of arcing damage, we found Region III to display the most reproducible emission characteristics. The voltage onset and the current rise in Region I were much less predictable for freshly prepared samples. However, it was found that initial application of a high voltage (non-arcing) "conditioning" pulse or ramp leads to reproducible I-V characteristics even in Region I.

EXAMPLE 2

Figure 4:
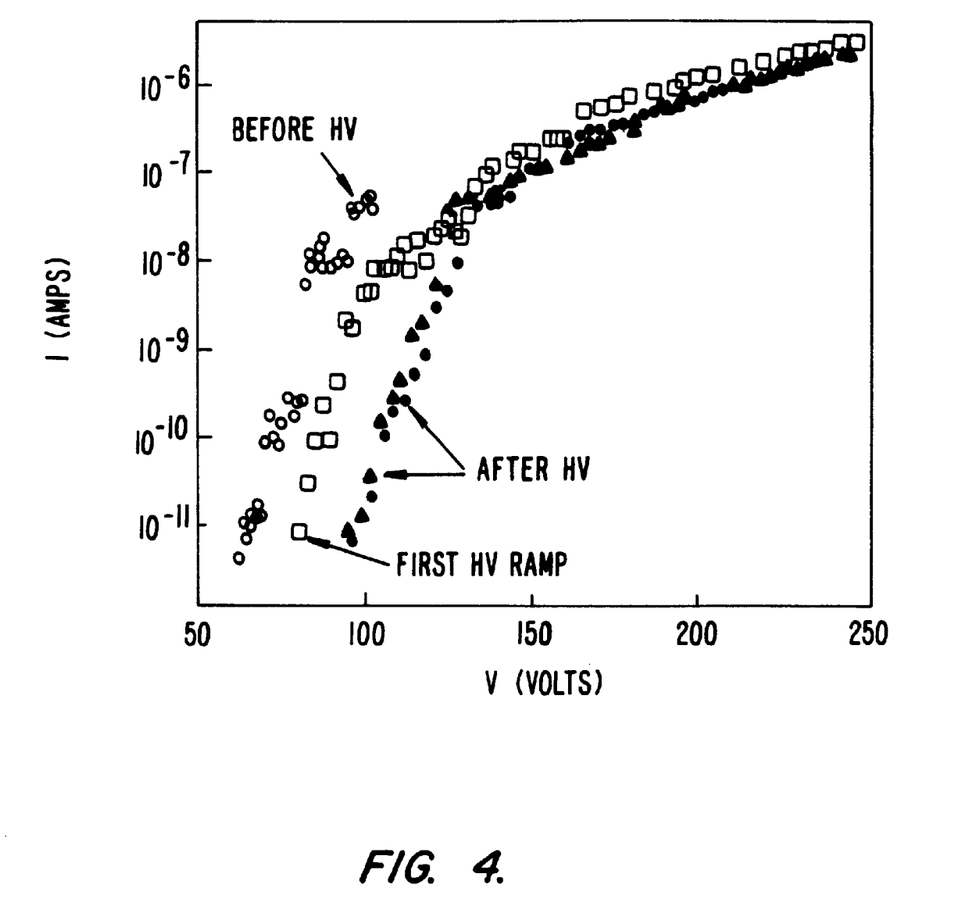
FIG. 4: shows a high voltage (HV) conditioning effect on matrix sample field emission. Conditioning leads to an increase in onset voltage but makes the curve more reproducible, as depicted by the two curves marked "After HV." These two curves were obtained at 20 $\mu$m and 60 $\mu$m separations from the accelerating grid, showing that the emission is quite independent of this distance. All data appear to curve toward the same high voltage asymptote (Region III).

FIG. 4 depicts I-V characteristics for a typical sample nanometer-scale field emission electron source before and after the conditioning described above. Before the high voltage ramp, the pristine sample showed a voltage onset at about 50 volts with a 20 µm sample-to-grid separation (open circles in FIG. 4). As long as the emission current was kept below 100 nA, the exact onset voltage was only reproducible within a 50 volts range, e.g. between 50 and 100 volts. Ramping once to higher voltages and currents, resulted in a "smoothing" of the I-V curve, a permanent general decrease of the emission current in Region I, and an increase in the voltage onset (open squares in FIG. 4). After a small number of such voltage ramps, the I-V curve was seen to be completely reproducible (closed symbols in FIG. 4), with an onset at 90±5 volts. The number of voltage ramps was preferably between about 2 and about 5. More preferably, the number of voltage ramps was about 3 or 4. The emission in Region III appeared unaffected by conditioning, with only the Region III voltage boundary being shifted.

A possible explanation for the conditioning effect is that the best field emitters quickly burn out, but are replaced by other, more stable emitters with higher onset voltages. These new emitters may be different tubes nearby on the sample, or they may be the same tube modified into a more stable geometry. Tubes sticking farthest from the surface should be the first emitters, but these are also most likely to suffer atomic rearrangement (R. Gomer, Field Emission and Field Ionization 1-195 (Harvard University Press, Cambridge, 1961) because of exposure to the high stresses of 1 dyne/µm² resulting from the large local fields. However, as our analysis below indicates, the character of the field emission before and after conditioning suggests that the nanotube tip work function and tip curvature of the emitting tubes remain essentially unchanged.

Conventional field emission analysis utilizes the Fowler-Nordheim (FN) equation (R. H. Fowler, & L. W. Nordheim, Proc. Roy. Soc. (London) A 119, 173, 1928), which relates measured emission current to the effective local electric field $E_{loc}$ at an emitting tip:

$$J = -6 \times 10^6 \left[ \frac{\sqrt{\mu/\Phi}}{\mu + \Phi} \right] E_{loc}^2 \exp[-7 \times 10^7 \Phi^{3/2} / E_{loc}] \text{ amp/cm}^2 \quad (1)$$

where J is the emission current density at the tip surface, $\Phi$ is the local work function of the emission tip, and µ is the local chemical potential. In the matrix sample configuration studied here, the total emission current may be due to an ensemble of emitting nanotubes, for which Eq. (1) is not directly applicable. However, assuming a narrow distribution of emission parameters, Eq. (1) provides a first order characterization of tube emission properties.

We first considered $E_{loc}$. With a sample-grid separation d=20 μm, the observed bias onset voltages for field emission from the matrix samples are of order 100 volts, which corresponds to an average applied electric field $E_{avg}=5\times10^4$ volts per centimeter (V/cm) in the region between the sample surface and the grid. This field value is nearly 1000 times smaller than typical local fields associated with field emission from sharp metallic tips and suggests that the actual local field at the nanotube tips is not simply the voltage bias per separation; instead $E_{loc} \gg E_{avg}$. Local field enhancement at a sharp tip can be modeled in one of two ways (Gomer, R. *Field Emission and Field Ionization* 1–195; Harvard University Press, Cambridge, 1961. In one case the small radius of curvature of the tip $R_{tip}$ simply enhances the average field by a multiplicative factor and $$E_{loc} \gamma E_{avg}/d \quad (2)$$

(with $\gamma \sim 1/R_{tip}$), while in another case where the tip is modeled as an isolated charged hemisphere the local field depends only on the applied bias voltage (V) yielding $$E_{loc}=V/\alpha R_{tip} \quad (3)$$

with α a constant of order unity.

Notably, field emission from the inventive nanometer-scale field emission electron source sample did not show the source-grid separation (d) dependence expected from Eq. (2). Indeed, after a high voltage conditioning ramp, the emission current was particularly insensitive to the sample-grid separation: the onset voltage had small deviations proportional to the separation, but the I-V curves were quite similar for separations from 20 to 100 μm in Regions I and II and the I-V curves are identical in Region III. This is the behavior expected from Eq. (3). Practically, this independence of the emission current on d is of tremendous importance as it allows large fabrication and utility tolerances. Physically, it suggests that the electric field is indeed confined to the immediate region of the tip by a high concentration of charge. These results are extremely important. They demonstrate that the inventive field emission sources are not as sensitive to the distance between the emitter and cathode as conventional field emission sources are. This feature overcomes a major problem related to field emission devices in flat panel displays.

EXAMPLE 3

Figure 5:
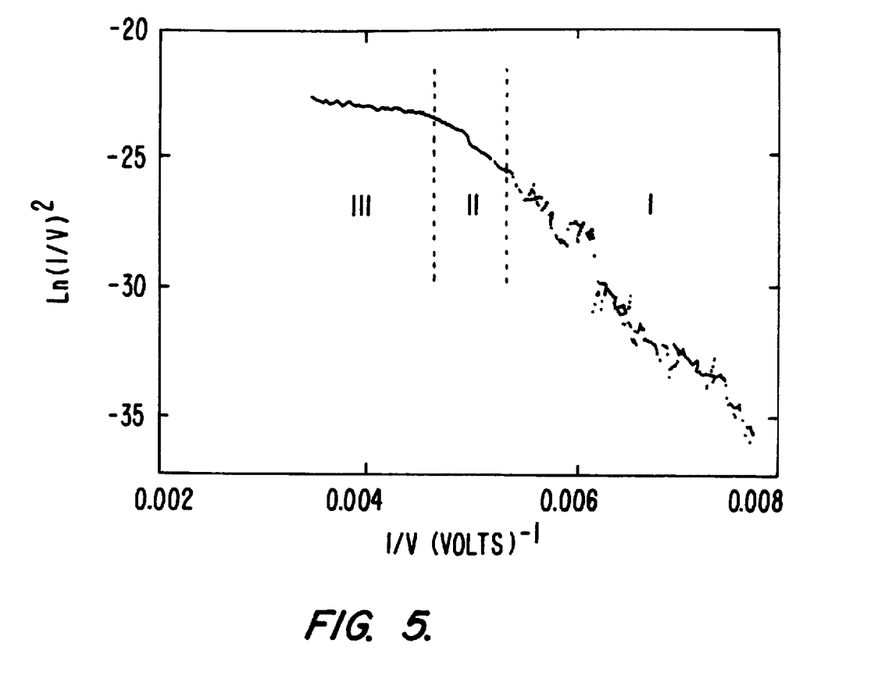
FIG. 5: shows a Fowler-Nordheim plot of $Ln(1/V^2]$ vs. 1/V for nanotube matrix sample. For conventional field emission tips, such a plot results in a straight line with slope S $R_{tip}\Phi^{3/2}$. The nanotube data fit the Fowler-Nordheim equation well in Region I and Region III, although the emission in the two cases clearly is of different character.
Figure 6:
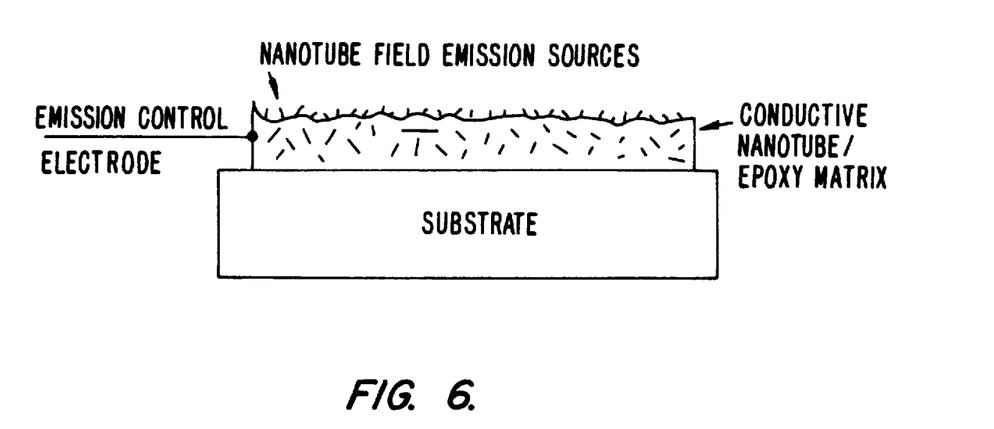
FIG. 6: shows one embodiment of the novel emission source.

FIG. 5 displayed the same data shown in FIG. 3 but plotted as $\ln(I/V^2)$ versus 1/V, a form motivated by the FN relationship, Eq. (1). If Eq. (1) is obeyed, such a plot should yield a straight line with slope S $\alpha R_{tip} \Phi^{3/2}$. Both regions I and III were consistent with this behavior. For Region I, assuming an average tip radius R~1–3 nm and α~6 due to geometry and screening, we obtained Φ=6–10 eV. For Region III we found Φ=2–5 eV, which is in the same range as the work function for graphite ($\Phi_{graphite}=5$ eV). Although it is possible that a high-field-induced atomic rearrangement affects the local work function of the nanotube emitters, the change in Φ between the two regions strongly suggests that the FN equation does not directly apply in at least one regime.

The change does indicate, though, that the emission of Region III has a completely different character from that of Region I. One possibility is that a buildup of space charge leads to a significant flattening of the I-V curve in Region III. Alternatively, emission in this state may be dominated by the finite resistivity of the tubes themselves. For emission from a long nanotube with high intrinsic resistance, a saturation in the current density is to be expected. In our experiments no current plateau is observed up to I≈0.1 mA, at which point the samples arc to the grid. It is possible that a more sophisticated model, taking into account distributions in the tube emission ensemble, could account for the unusual I-V characteristic of Region III.

EXAMPLE 4

Instead of constructing discreet pixels as described above, active emission surfaces have been patterned on to a larger surface area. A patterned array of emitting and non-emitting regions are useful for many commercial applications. Three methods were found to reliably create a pattern of electron field emitters that could be independently controlled with an underlying electrode network or circuit.

Two of the methods relied on inactivating portions of the emitter surface.

One of the methods comprised applying a metal overlayer, for example, gold, to portions of an emitter surface. A nanotube-binder matrix was dried onto a glass slide. The matrix surface area was approximately 2 cm by 2 cm. Using conventional sputtering techniques, a gold overlayer about 5 nm thick was applied to selected regions of the 4 cm² emitter surface area. The metal overlayer effectively protected the nanotube tips from high electric fields and quenched all field emission. No current was detected from gold-overlaid regions at voltages up to 1000 volts even though those regions had emitted before the metal layer was applied.

A second patterning method comprises ion sputter etching of the sample to damage the surface and emitting tips. Samples were bombarded with Ar⁺ fluxes of 15 nA for up to ten minutes. Field emission was reduced by a factor of 10 in regions exposed to the maximum dose of Ar⁺. Additionally, the voltage onset value was nearly always 50–75 volts higher than it had been prior to etching via ion bombardment. A corresponding decrease in emission current in Region I was observed. And, the transition from Region I to Region III occurred at a current 10 times lower than before ion etching, that is, at 1 nA instead of 10 nA. At higher voltages, the emission completely saturated at 1 μA. Further, at any given voltage the electron emission from regions of the sample that had been ion bombarded were much less stable than prior to bombardment. The sputtered samples did not exhibit any "on" regions at which they emit stably over time.

The sputter etching may provide a particularly important technique for device fabrication. At small scales, metallic separation of independent emitters could be problematic if electric voltages exceed several 100 volts because arcing can occur between metal overlayer regions. Focused ion damage to produce emitting and non-emitting regions is a more promising technique since the non-emitting regions will not have any effect on the pristine regions.

A patterned area of emitting and non-emitting regions can also be achieved by selectively depositing pixels of nanotube matrix material using processes similar to silk screening onto a substrate. An approximately 2 cm×2 cm area of a glass slide substrate was covered by a mask made of copper mesh. The mesh size was about 0.2 mm wide and had square openings of about 0.2 mm. The still fluid and uncured binder-nanotube matrix material was swept across the top of the copper mesh with a flexible scraper, pressing the binder-nanotube material through the mesh holes onto the glass slide. The mesh was immediately removed, leaving behind a patterned array of discreet nanotube matrix field emission sources, each of having an area of approximately 0.2 mm×0.2 mm. For some applications, independent electrical contacts are first placed on the substrate at each pixel site. This 0.2 mm square pixel size is a useful size for television and flat panel displays. Using techniques generally known in the art, the array can be made larger or smaller, patterned according to need, and the pixels sizes made larger or smaller.

Thus, the invention provides a novel field emission electron source material and nanometer-scale field emission electron source, commonly known as field emission devices (FEDs). The novel FED are insensitive to emitter-cathode distances and do not require ultra high vacuum for operation. They are useful for flat panel displays, electrostatic scrubbers for industrial air pollution control, or other applications where high local electric fields are useful.

The description of illustrative embodiments and best modes of the present invention is not intended to limit the scope of the invention. Various modifications, alternative constructions and equivalents may be employed without departing from the true spirit and scope of the appended claims.

Based on the invention described above, we claim:

1. An electric field emitter material comprising,
   a) a volume of binder; and
   b) a volume of $B_XC_YN_Z$ nanotubes suspended in the binder, where x, y, and z are numbers that indicate the relative ratios boron, carbon, and nitrogen.

2. The field emitter material of claim 1 wherein the volume of binder is between about 0.01 and about 10 times the volume of nanotubes.

3. The field emitter material of claim 1 wherein the volume of binder is between about 0.03 and about 3 times the volume of nanotubes.

4. The field emitter material of claim 1 wherein the volume of binder is about equal to the volume of nanotubes.

5. The field emitter material of claim 1 wherein the binder is electrically conducting.

6. The field emitter material of claim 1 wherein the binder is electrically non-conducting.

7. The field emitter material of claim 5 wherein the binder is chosen from the group consisting of epoxy, teflon, cyanoacrylate, polyethylene, ceramics, soft metals, and low melting point metals.

8. The field emitter material of claim 6 wherein the binder is chosen from the group consisting of epoxy, teflon, cyanoacrylate, polyethylene, ceramics, soft metals, and low melting point metals.

9. The field emitter material of claim 1 wherein the $B_XC_YN_Z$ nanotubes are electrically conducting when measured at about one volt.

10. The field emitter material of claim 1 wherein the $B_XC_YN_Z$ nanotubes are semimetallic when measured at about one volt.

11. The field emitter material of claim 1 wherein the $B_XC_YN_Z$ nanotubes are semiconducting when measured at about one volt.

12. The field emitter material of claim 1 wherein the $B_XC_YN_Z$ nanotubes are electrically insulating when measured at about one volt.

13. The field emitter material of claim 1 wherein the $B_XC_YN_Z$ nanotubes comprise a mixture of tubes comprising having electrical characteristics chosen from the group consisting of electrically conducting, semimetallic, semiconducting, and insulating.

14. The field emitter material of claim 1 wherein individual $B_XC_YN_Z$ nanotubes have two or more regions characterized by electrical properties chosen from the group consisting of electrically conducting, semimetallic, semiconducting, and insulating.

15. The electric field emitter material of claim 1 having metal deposited on it to form a pattern.

16. The electric field emitter material of claim 1 having inactive regions resulting from ion bombardment.

17. The electric field emitter material of claim 1 deposited through a mask onto a surface.

18. The electric field emitter material of claim 1 wherein the $B_XC_YN_Z$ nanotubes have X and Z=0 and Y-1.

19. An electric field emitter material comprising, $B_XC_YN_Z$ nanotubes bound to one another in a matrix, where x, y, and z are numbers that indicate the relative ratios boron, carbon, and nitrogen.

20. The field emitter material of claim 19 wherein the $B_XC_YN_Z$ nanotubes are chemically polymerized to one another.

21. A field emission electron source comprising,
   a) a volume of binder;
   b) a volume of $B_XC_YN_Z$ nanotubes suspended in the binder, where x, y, and z are numbers that indicate the relative ratios of boron, carbon, and nitrogen; and
   c) at least one electrode attached to the binder matrix.

22. The field emission electron source of claim 21 having an electron emission area between about 1 and $\mu^2$ about 1 m$^2$.

23. The field emission electron source of claim 21 having an electron emission area between about 10 $\mu^2$ and about 100 cm$^2$.

24. The field emission electron source of claim 21 having an electron emission area between about 50 $\mu^2$ and about 10 cm$^2$.

25. The electric field emitter material of claim 21 wherein the $B_XC_YN_Z$ nanotubes have X and Z=0 and Y=1.

* * * * *